(12) United States Patent
Iwahashi et al.

(10) Patent No.: US 11,233,701 B2
(45) Date of Patent: *Jan. 25, 2022

(54) POLICY CONFLICT DETECTION SYSTEM AND POLICY CONFLICT DETECTION METHOD

(71) Applicant: Nippon Telegraph and Telephone Corporation, Tokyo (JP)

(72) Inventors: Hiroki Iwahashi, Musashino (JP); Kaori Kurita, Musashino (JP); Hideaki Iwata, Musashino (JP); Kazuhiro Matsuo, Musashino (JP); Hidetaka Nishihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,779

(22) PCT Filed: Feb. 6, 2019

(86) PCT No.: PCT/JP2019/004263
§ 371 (c)(1),
(2) Date: Aug. 21, 2020

(87) PCT Pub. No.: WO2019/163517
PCT Pub. Date: Aug. 29, 2019

(65) Prior Publication Data
US 2021/0092017 A1 Mar. 25, 2021

(30) Foreign Application Priority Data
Feb. 22, 2018 (JP) .............................. JP2018-029968

(51) Int. Cl.
*H04L 12/24* (2006.01)

(52) U.S. Cl.
CPC ................................ *H04L 41/0893* (2013.01)

(58) Field of Classification Search
CPC .................................................. H04L 41/0893
(Continued)

(56) References Cited

U.S. PATENT DOCUMENTS

2014/0040975 A1* 2/2014 Raleigh ................ G06Q 30/016
726/1
2016/0210578 A1* 7/2016 Raleigh ................ H04M 15/80

FOREIGN PATENT DOCUMENTS

JP 2016-149718 8/2016

OTHER PUBLICATIONS

[No Author Listed], "3GPP TS 23.203 V15.0.0—3rd Generation Partnership Protect; Technical Specification Group Services and System Aspects; Policy and charging control architecture (Release 15)," 3GPP A Global Initiative. Sep. 2017, 15:257 pages.

* cited by examiner

*Primary Examiner* — David R Lazaro
*Assistant Examiner* — Zia Khurshid
(74) *Attorney, Agent, or Firm* — Fish & Richardson P.C.

(57) ABSTRACT

A policy conflict detection system includes a determination unit configured to determine, in response to an instruction to apply to a first network operator which performs policy control based on a set of first policies, a second policy from a second network operator, whether a third policy, which matches the second policy in terms of a priority, an application period, a control target, and a control condition and which has a control content exclusive of that of the second policy is present among the first policies, thereby enabling detection of conflict of the policies.

20 Claims, 6 Drawing Sheets

(58) Field of Classification Search
USPC .......................................................... 709/223
See application file for complete search history.

POLICY CONFLICT DETECTION SYSTEM AND POLICY CONFLICT DETECTION METHOD

CROSS-REFERENCE TO RELATED APPLICATIONS

This application is a National Stage application under 35 U.S.C. § 371 of International Application No. PCT/JP2019/004263, having an International Filing Date of Feb. 6, 2019, which claims priority to Japanese Application Serial No. 2018-029968, filed on Feb. 22, 2018. The disclosure of the prior application is considered part of the disclosure of this application, and is incorporated in its entirety into this application.

TECHNICAL FIELD

The present disclosure relates to a policy conflict detection system and a policy conflict detection method.

BACKGROUND ART

In a fixed network and a mobile network, policy control is performed in which it is possible to unitarily perform intensive management on network resources and in which it is possible to customize a service for each user. In the policy control, a PCEF performs the policy control according to a set policy.

The policy that is set for the PCEF includes a static policy that is set for the PCEF in advance and a dynamic policy that is dynamically set from a PCRF based on an onset of communication by the user, or the like. And priorities can be set for each of the policies regardless of the static policy and the dynamic policy. In a case where simultaneous instructions to apply a plurality of policies and the static policy and the dynamic policy has the same priority, the dynamic policy is generally applied. The policy control up to now is assumed to be performed by a single network operator.

On the other hand, demands for fixed and mobile cooperative services are increasing for conventional services provided by the fixed network or the mobile network solely. Therefore, there is a possibility that an instruction to apply not only a policy generated in the single PCRF but also a policy from the PCRF of another network operator is generated.

Note that, an interface is defined by 3GPP for cooperation with a fixed network BPCF and a mobile network PCRF and for cooperation with the PCRF/BPCF and the PCEF. In addition, cooperation interfaces, such as a cooperation with another operator in the fixed network and a H-PCRF and a V-PCRF cooperation in the mobile network, are expected to increase in the future.

CITATION LIST

Patent Literature

Patent Literature 1: JP 2016-149718 A

Non Patent Literature

Non Patent Literature 1: 3GPP TS23.203 ver.15.0.0, [online], Internet <URL: http://www.3gpp.org/ftp//Specs/archive/23_series/23.203/23203-f00.zip>

SUMMARY OF THE INVENTION

Technical Problem

However, in a case where policy cooperation between BPCF to PCRF is taken into consideration, there is a possibility that priorities of the policies conflict. For example, in a case where a policy as instructed from a mobile network PCRF to a fixed network BPCF satisfies two conditions under which
(1) a priority of a policy from a mobile network PCRF is identical to a priority of a policy defined in a fixed network BPCF, and
(2) a policy from a mobile network PCRF is an incompatible policy which is not possible to be simultaneously set with the policy defined in the fixed network BPCF,
there is a case where the policy is not processed with an appropriate priority and causes deterioration in a service quality.

For example, in a case where a priority of an incompatible policy as instructed by the mobile network PCRF (hereinafter referred to as a "mobile network policy") is identical to a priority of a policy defined by the fixed network BPCF (hereinafter, referred to as a "fixed network policy") and when the mobile network policy is processed with a lower priority than the fixed network policy, prolongation of execution waiting time is a concern.

In particular, in a case where the mobile network policy and the fixed network policy include incompatible conditions (for example, the same priority is given to both a condition of interrupting a certain communication and a condition of performing prioritized communication, even though the former has to be prioritized), there is a possibility that it is not possible to provide an appropriate service.

Accordingly, there is a need for a mechanism that can appropriately detect conflict between policies.

Note that, a situation in which a plurality of incompatible policies having the identical priority are present is not taken into consideration in 3GPP and BBF.

The present disclosure has been made in view of the above problems, and an object of the present disclosure is to enable detection of the conflict between policies.

Means for Solving the Problem

To solve the above problem, there is provided a policy conflict detection system including a determination unit configured to determine, in response to an instruction to apply to a first network operator, which performs policy control based on a set of first policies, a second policy from a second network operator, whether a third policy, which matches the second policy in terms of a priority, an application period, a control target, and a control condition and which has a control content exclusive of that of the second policy, is present among the first policies.

Effects of the Invention

It is possible to detect conflict between policies.

DESCRIPTION OF EMBODIMENTS

Figure 1:
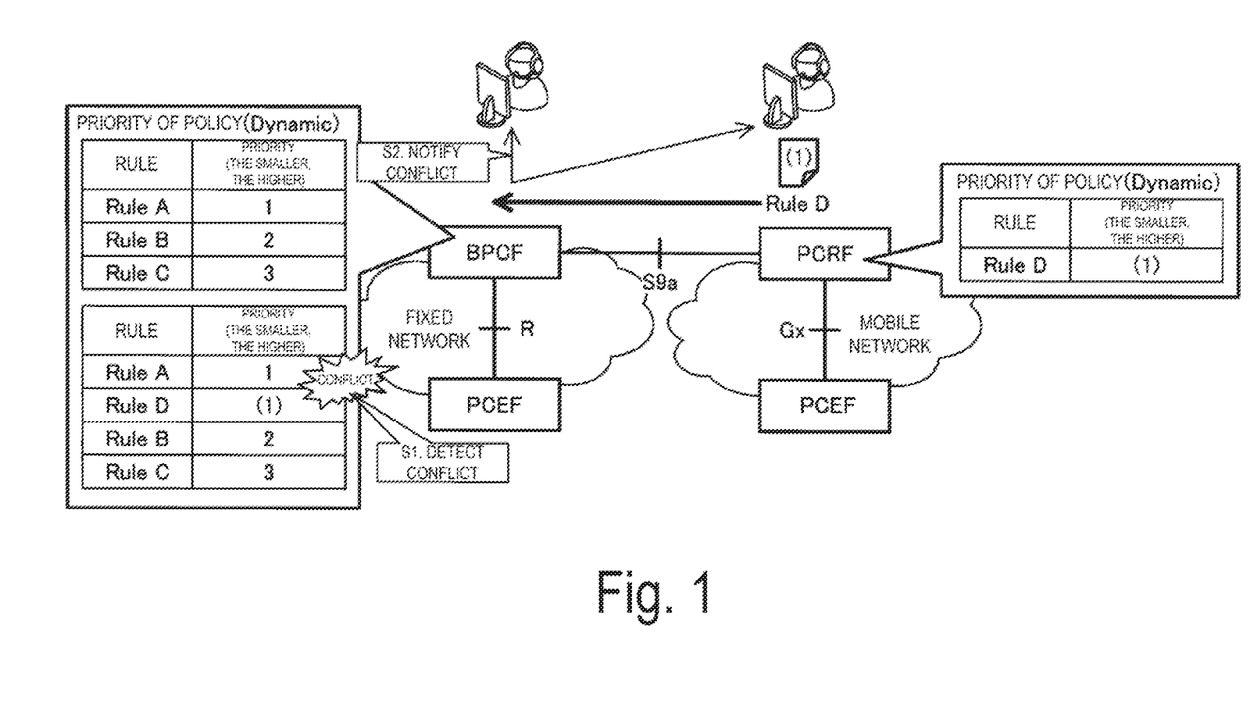
FIG. 1 is a diagram illustrating an overview of an embodiment of the present disclosure.

Hereinafter, an embodiment of the present disclosure will be described with reference to the accompanying drawings. FIG. 1 is a diagram illustrating an overview of the embodiment of the present disclosure. FIG. 1 illustrates an example of an instruction, from a PCRF of a mobile network of a certain network operator which performs policy control based on a policy set, that instructs application of a policy (Rule D) to a PCEF of a fixed network of another network provider, the instruction being given to a BPCF of the fixed network.

In this case, in a case where the policy (Rule D) according to the instruction of an application has a priority matching with a priority of any policy held by the BPCF, and includes an incompatible condition, a policy conflict detection system 10 detects conflict between policies (S1), and notifies each network operator of the detected conflict (S2).

Note that, although FIG. 1 illustrates the example of the instruction to apply the policy from the PCRF to the BPCF, similar processing may be also performed for a case of an instruction to apply the policy from the BCRF to the RPCF. In addition, the policy conflict detection system 10 is deployed in, for example, one or more computers that constitute the BPCF, the PCRF, or the like.

Figure 2:
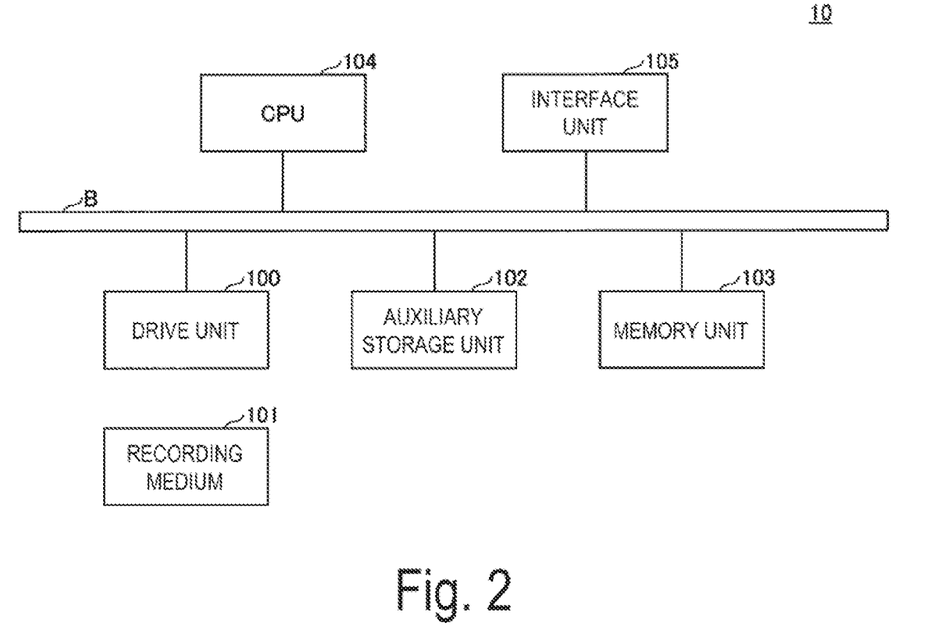
FIG. 2 is a diagram illustrating a hardware configuration example of a policy conflict detection system 10 according to the embodiment of the present disclosure.

FIG. 2 is a diagram illustrating a hardware configuration example of the policy conflict detection system 10 according to the embodiment of the present disclosure. The policy conflict detection system 10 of FIG. 2 includes a drive unit 100, an auxiliary storage unit 102, a memory unit 103, a CPU 104, an interface unit 105, or the like, which each are connected to each other through a bus B.

A program for realizing processing in the policy conflict detection system 10 is provided using a recording medium 101 such as a CD-ROM. In a case where the recording medium 101 which stores the program is set in the drive unit 100, the program is installed on the auxiliary storage unit 102 from the recording medium 101 through the drive unit 100. However, the program does not have to be installed using always the recording medium 101, and the program may be downloaded from another computer through a network. The auxiliary storage unit 102 stores the installed program and stores necessary files and data.

The memory unit 103 reads the program from the auxiliary storage unit 102 and stores the program in a case where a program activation instruction is given. The CPU 104 executes a function relating to the policy conflict detection system 10 according to the program stored in the memory unit 103. The interface unit 105 is used as an interface for connecting to the network.

Note that, the hardware configuration illustrated in FIG. 2 may be included in the BPCF or the PCRF in a deployment destination of the policy conflict detection system 10.

Figure 3:
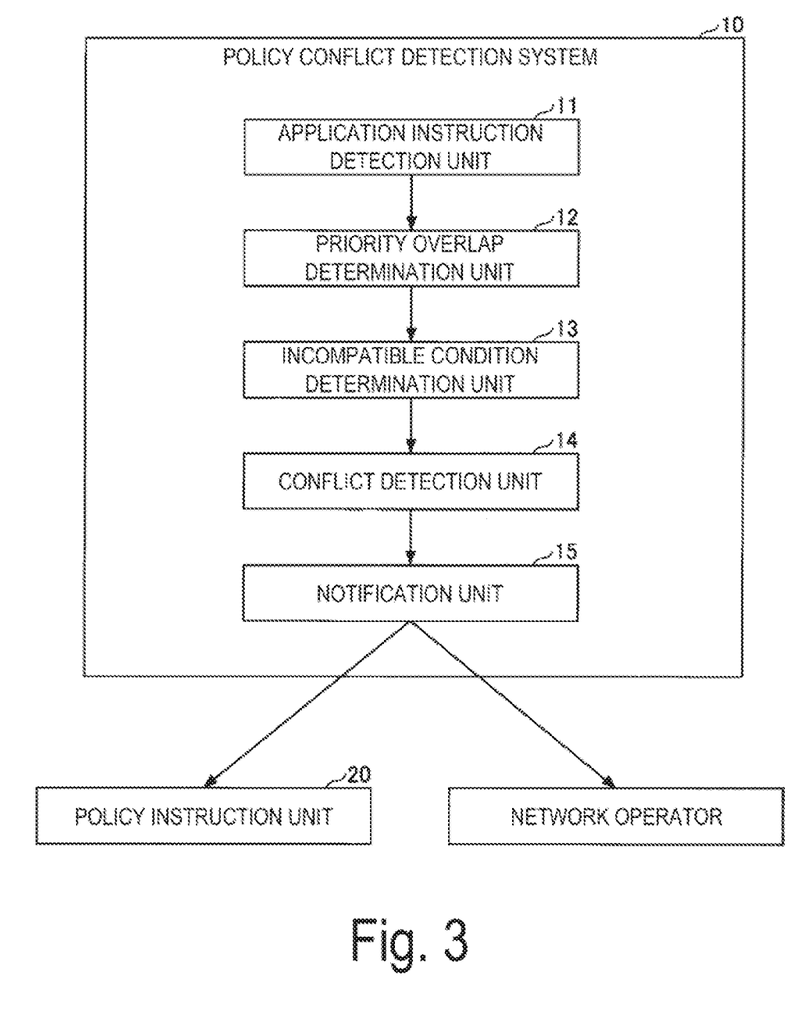
FIG. 3 is a diagram illustrating a functional configuration example of the policy conflict detection system 10 according to the embodiment of the present disclosure.

FIG. 3 is a diagram illustrating a functional configuration example of the policy conflict detection system 10 according to the embodiment of the present disclosure. In FIG. 3, the policy conflict detection system 10 includes an application instruction detection unit 11, a priority overlap determination unit 12, an incompatible condition determination unit 13, a conflict detection unit 14, and a notification unit 15. Each of the units is realized by processing by which one or more programs installed on the policy conflict detection system 10 cause the CPU 104 to execute.

In the BFPC or the PCRF of a network operator (an own network operator) as the deployment destination of the policy conflict detection system 10, the application instruction detection unit 11 detects reception of an instruction to apply a policy from a BFPC or the PCRF of another network operator (hereinafter, referred to as "another policy").

The priority overlap determination unit 12 determines whether a priority, which is set to each policy held by the BFPC or the PCRF of the own network operator (hereinafter, referred to as an "own policy"), overlaps a priority of the another policy.

The incompatible condition determination unit 13 determines presence or absence of competing conditions corresponding to incompatible content that is not capable of being simultaneously set, between each own policy, which has a priority that matches with that of the other policy, and the another policy. That is, the incompatible condition determination unit 13 determines whether an intersection of the content of the respective policies becomes a null set, for example, determines whether a following equation is established, $R(A) \cap R(D) = \varphi$, in a case where content of a policy A is defined as $R(A)$ and content of a policy B is defined as $R(B)$.

The conflict detection unit 14 detects the conflict between policies based on a result of determination by the priority overlap determination unit 12 and a result of determination by the incompatible condition determination unit 13. That is, the conflict detection unit 14 detects the conflict between policies in a case where priorities of a plurality of policies to be simultaneously applied to an identical user, match with each other and also the content of the plurality of policies are incompatible with each other.

In a case where the conflict between policies is detected, the notification unit 15 notifies a policy instruction unit 20 and a network operator which gives an instruction to apply each policy relating to the conflict of information relevant to the conflict. Note that, the policy instruction unit 20 is a functional unit, included in the PCRF or the BPCF, which gives an instruction to apply a policy to the PCEF.

Figure 4:
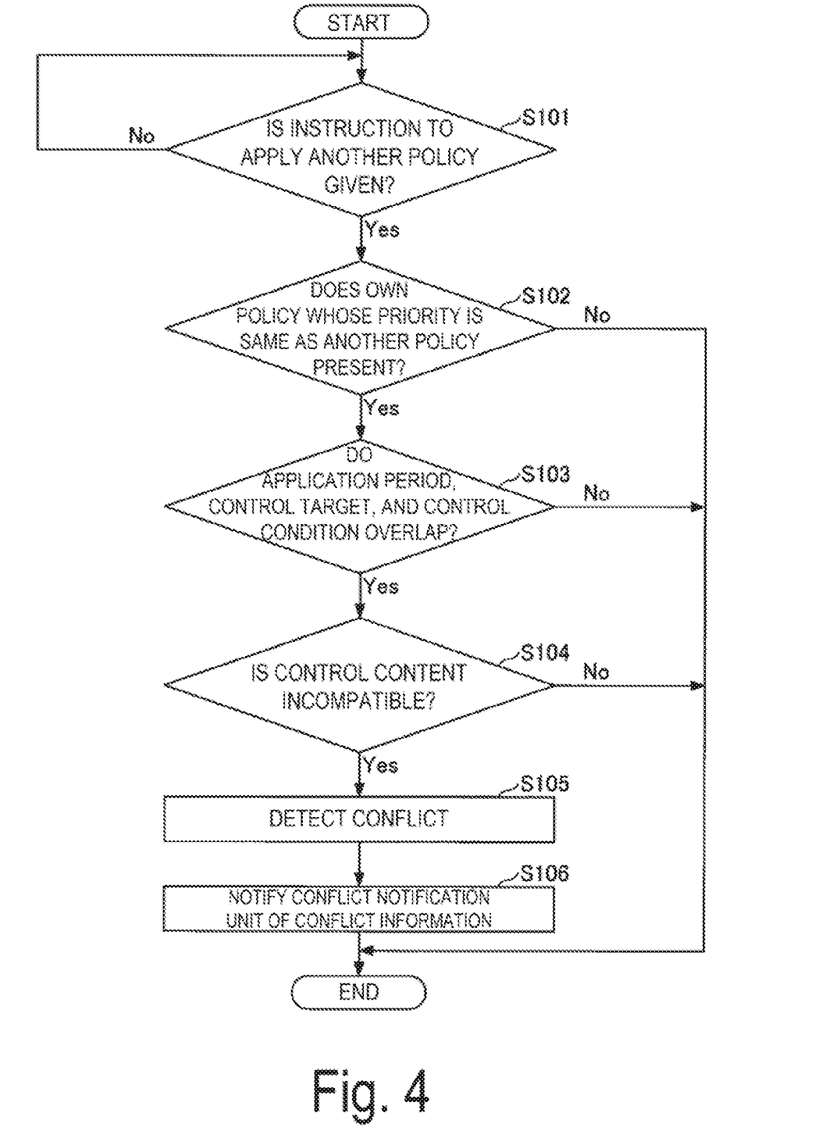
FIG. 4 is a flowchart for illustrating an example of a processing procedure of policy conflict detection processing.

Hereinafter, a processing procedure executed by the policy conflict detection system 10 will be described. FIG. 4 is a flowchart for illustrating an example of a processing procedure of policy conflict detection processing.

In a case where the application instruction detection unit 11 detects that an instruction to apply the another policy is received (Yes in S101), the priority overlap determination unit 12 determines whether the own policy which has the priority that matches with the another policy is present (S102).

In a case where the own policy which has the priority that matches with the another policy (hereinafter, referred to as a "priority matching policy") is not present (No in S102), the processing in FIG. 4 ends. In a case where one or more priority matching policies are present (Yes in S102), the incompatible condition determination unit 13 determines whether the priority matching policy which has an application period, a control target, and a control condition that overlap with the another policy (hereinafter, referred to as an "overlapping policy"), is present (S103).

Here, the application period refers to a period during which the policy is applied. In the application period, an application start time and end time or only an application start time are used. In addition, a fact that the application periods overlap refers that at least some application periods overlap between policies to be compared.

In addition, the control target is, for example, identification information, such as an application destination IP address or IMSI information, which is relevant to the user. An overlap of the control target means that each policy to be compared includes an identical control target.

In addition, the control condition includes, for example, an excess of a threshold of an amount of communication data of a month. An overlap of the control conditions refers to presence of identical control conditions between the policies to be compared.

In a case where the overlapping policy is not present (No in S103), the processing in FIG. 4 ends. In a case where one or more overlapping policies are present (Yes in S103), the incompatible condition determination unit 13 determines whether the overlapping policy which has the control content that is incompatible (exclusive) with the another policy (hereinafter, referred to as a "conflict policy"), is present (S104). Here, the control content is, for example, a bandwidth restriction for each data flow or URL filtering. In addition, an overlap of the control content refers to presence of incompatible conditions which are not possible to be simultaneously set among the policies to be compared. That is, in a case where the intersection of the control content among the policies is the null set, it is determined that the control content overlaps.

In a case where the conflict policy is not present (No in S104), the processing in FIG. 4 ends. In a case where one or more conflict policies are present (Yes in S104), the conflict detection unit 14 detects the conflict between policies (S105). Subsequently, the conflict detection unit 14 notifies the notification unit 15 of information relevant to the conflict between policies (hereinafter, referred to as "conflict information") (S106). The notification of the conflict information refers to a notification that the conflict is detected. The conflict information includes the another policy, the conflict policy, conflict detection time (that is, current time), and conflict content. The conflict content refers to information indicating, for each of the application period, the control target, and the control condition, a specific overlapping value (a specific overlapping period, a specific overlapping control target (an IP address, or the like), a specific identical control condition, or specific incompatible control content. Note that, the conflict content is specified by the incompatible condition determination unit 13.

Figure 5:
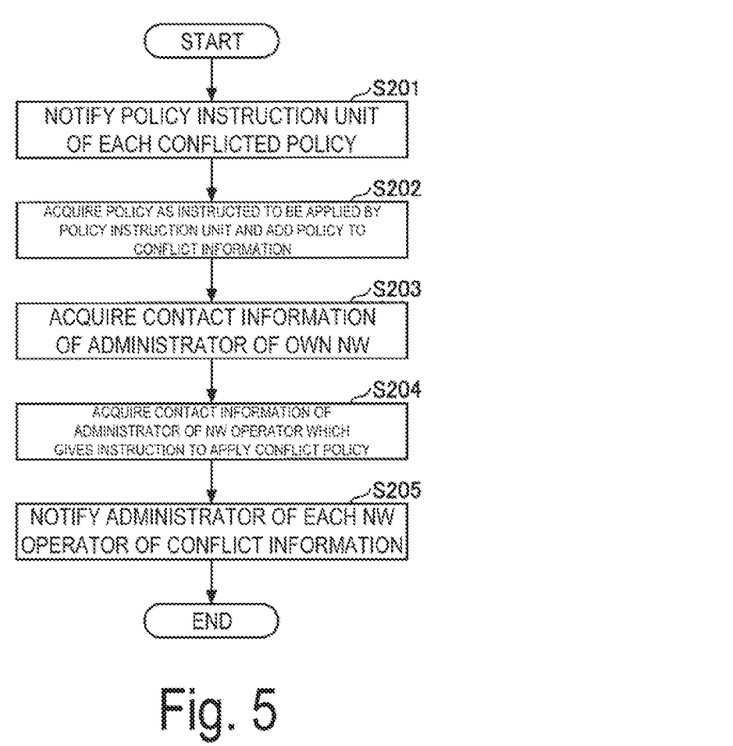
FIG. 5 is a flowchart for illustrating an example of a processing procedure of policy conflict notification processing.

FIG. 5 is a flowchart for illustrating an example of a processing procedure of policy conflict notification processing. The notification unit 15 starts the processing procedure of FIG. 5 according to the notification of the conflict information from the conflict detection unit 14.

In step S201, the notification unit 15 notifies the policy instruction unit 20 of respective policies relating to the conflict (the another policy and the conflict policy), which are included in the conflict information notified by the conflict detection unit 14. The policy instruction unit 20 selects a policy to be applied from among any of the respective policies based on a prescribed logic, and gives an instruction to apply the selected policy to the PCEF.

Subsequently, the notification unit 15 acquires a policy as actually instructed to be applied by the policy instruction unit 20 (hereinafter referred to as an "application policy"), from the policy instruction unit 20, and adds the application policy to the conflict information (S202).

Subsequently, the notification unit 15 acquires contact information of an administrator of the own network operator (for example, an IP address of a terminal of the administrator, or the like) (S203). Subsequently, contact information of an administrator of a network operator which gives an instruction to apply the another policy (for example, an IP address of a terminal of the administrator, or the like) is acquired (S204). Note that, the contact information of the respective administrators may be stored in, for example, the auxiliary storage unit 102.

Subsequently, the notification unit 15 notifies (sends) the administrator of the own network operator and the administrator of another network operator which gives an instruction to apply the another policy of the conflict information (S205). Note that, the conflict information may include information relevant to the own network operator (connection information such as an operator name or an address/host name of the own PCRF or the own BPCF) and information relevant to the another network operator (connection information such as an operator name or an address/host name of the PCRF or the BPCF which gives an instruction to apply the another policy).

Figure 6:
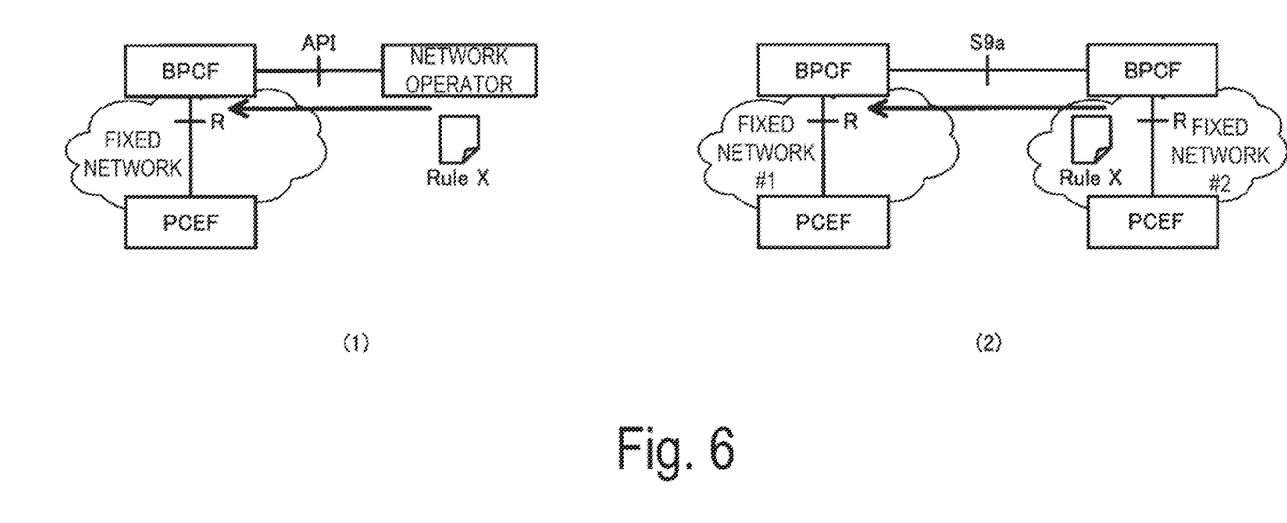
FIG. 6 is a diagram illustrating another configuration example to which it is possible to apply the embodiment.

Note that, the embodiment may be applied to a configuration illustrated in FIG. 6 in addition to the configuration illustrated in FIG. 1.

FIG. 6 is a diagram illustrating another configuration example to which it is possible to apply the embodiment. (1) of FIG. 6 is a configuration of an instruction to apply a policy from another network operator through an API. (2) of FIG. 6 is a configuration of an instruction to apply a policy from a BPCF of a fixed network of a certain network operator to a BPCF of a fixed network of another network operator.

As described above, according to the embodiment, it is possible to detect the conflict of the policies in a case where an instruction to apply a plurality of policies, which are not capable of being simultaneously applied to a single terminal, is generated. In addition, it is possible to notify a prescribed notification destination, such as each network operator, of the conflict.

As a result, it is possible for each network operator to know the conflict of the policies at an early stage and to prevent a situation in which it is not possible to provide an intended service. Further, it is possible to contribute to efficient assignment of resources.

Note that, in the embodiment, the priority overlap determination unit 12, the incompatible condition determination unit 13, and the conflict detection unit 14 are examples of a determination unit.

Hereinabove, although the embodiment of the present disclosure has been described in detail, the present disclosure is not limited to the fixed embodiments and various modifications and changes are possible within a scope of the gist of the present disclosure described in the claims.

REFERENCE SIGNS LIST

10 Policy conflict detection system
11 Application instruction detection unit
12 Priority overlap determination unit
13 Incompatible condition determination unit
14 Conflict detection unit
15 Notification unit
20 Policy instruction unit
100 Drive unit 101 Recording medium
102 Auxiliary storage unit
103 Memory unit
104 CPU
105 Interface unit
B Bus

The invention claimed is:

1. A policy conflict detection system, comprising:
a memory; and
one or more computers configured to determine, in response to an instruction to apply to a first network operator, which performs policy control based on a set of first policies, a second policy from a second network operator, whether the second policy is capable of being set at the first network operator based on whether a third policy that cannot be set, at the first network operator, simultaneously with the second policy (i) is present among the set of first policies, and (ii) has a priority level that matches the priority level of the second policy,
wherein the second policy and the third policy have at least one of overlapping application periods, matching control targets, or matching control conditions,
wherein the application periods are a period during which each of the second policy and the third policy is applied to a control target.

2. The policy conflict detection system according to claim 1, wherein the one or more computers are further configured to
notify a prescribed notification destination of information including the second policy and the third policy in a case where the one or more computers determine that the third policy is present among the set of first policies, and has the priority level that matches the priority level of the second policy.

3. The policy conflict detection system according to claim 2,
wherein the prescribed notification destination includes the first network operator and the second network operator.

4. The policy conflict detection system according to claim 1, wherein determining whether a third policy is present comprises:
determining whether the second policy and one or more policies of the set of first policies have matching priority levels,
based on the second policy and the one or more first policies being determined to have the matching priority levels, determining whether the second policy and the one or more first policies have overlapping conditions that include application periods, control targets, and control conditions,
based on the second policy and the one or more first policies being determined to have at least one overlapping conditions, determining whether the one or more first policies have a control content exclusive of a control content of the second policy, and
determining, based on the one or more first policies being determined to have the control content, that the third policy is present among the first policies.

5. The policy conflict detection system according to claim 4, wherein determining whether the one or more first policies have the control content comprises:
determining whether an intersection between a control content of the one or more first policies and a control content of the second policy becomes a null set.

6. The policy conflict detection system according to claim 5, wherein, based on the intersection becoming the null set, the control content of the second policy overlaps the control content of the one or more first policies such that the third policy is present that cannot be set simultaneously with the second policy.

7. The policy conflict detection system according to claim 4, wherein determining whether the second policy and the one or more first policies have the overlapping application periods comprises:
determining whether at least one portion of an application period of the second policy overlaps with application periods of the one or more first policies.

8. The policy conflict detection system according to claim 1, wherein the control conditions include an excess of a threshold of an amount of communication data of a month.

9. The policy conflict detection system according to claim 1, wherein the control targets include an application destination IP address or International Mobile Subscriber Identity (IMSI) information.

10. The policy conflict detection system according to claim 1, wherein, in the application period, an application start time and an application end time are used.

11. The policy conflict detection system according to claim 1, wherein, in the application period, only an application start time is used.

12. A policy conflict detection method executed by a computer, the method comprising:
determining, in response to an instruction to apply to a first network operator, which performs policy control based on a set of first policies, a second policy from a second network operator, whether the second policy is capable of being set at the first network operator based on whether a third policy that cannot be set, at the first network operator, simultaneously with the second policy (i) is present among the set of first policies, and (ii) has a priority level that matches the priority level of the second policy,
wherein the second policy and the third policy have at least one of overlapping application periods, matching control targets, or matching control conditions,
wherein the application periods are a period during which each of the second policy and the third policy is applied to a control target.

13. The policy conflict detection method executed by the computer according to claim 12, further comprising:
notifying a prescribed notification destination of information including the second policy and the third policy in a case where presence of the third policy is determined present among the set of first policies, and has the priority level that matches the priority level of the second policy.

14. The policy conflict detection method according to claim 13,
wherein the prescribed notification destination includes the first network operator and the second network operator.

15. The policy conflict detection method according to claim 12, wherein determining whether a third policy is present comprises:
determining whether the second policy and one or more policies of the set of first policies have matching priority levels,
based on the second policy and the one or more first policies being determined to have the matching priority levels, determining whether the second policy and the one or more first policies have overlapping conditions that include application periods, control targets, and control conditions, based on the second policy and the one or more first policies being determined to have at least one overlapping conditions, determining whether the one or more first policies have a control content exclusive of a control content of the second policy, and determining, based on the one or more first policies being determined to have the control content, that the third policy is present among the first policies.

16. The policy conflict detection method according to claim 15, wherein determining whether the one or more first policies have the control content comprises:

determining whether an intersection between a control content of the one or more first policies and a control content of the second policy becomes a null set.

17. The policy conflict detection method according to claim 16, wherein, based on the intersection becoming the null set, the control content of the second policy overlaps the control content of the one or more first policies such that the third policy is present that cannot be set simultaneously with the second policy.

18. The policy conflict detection method according to claim 15, wherein determining whether the second policy and the one or more first policies have the overlapping application periods comprises:

determining whether at least one portion of an application period of the second policy overlaps with application periods of the one or more first policies.

19. The policy conflict detection method according to claim 12, wherein the control conditions include an excess of a threshold of an amount of communication data of a month.

20. The policy conflict detection method according to claim 12, wherein the control targets include an application destination IP address or International Mobile Subscriber Identity (IMSI) information.

* * * * *